US008606781B2

(12) United States Patent
Chi et al.

(10) Patent No.: US 8,606,781 B2
(45) Date of Patent: Dec. 10, 2013

(54) SYSTEMS AND METHODS FOR PERSONALIZED SEARCH

(75) Inventors: Ed Chi, Palo Alto, CA (US); Fabio Gasparetti, Rome (IT)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1566 days.

(21) Appl. No.: 11/200,557

(22) Filed: Aug. 9, 2005

(65) Prior Publication Data
US 2006/0248059 A1    Nov. 2, 2006

Related U.S. Application Data

(60) Provisional application No. 60/676,462, filed on Apr. 29, 2005.

(51) Int. Cl.
*G06F 17/30* (2006.01)
(52) U.S. Cl.
USPC .......................................................... 707/734
(58) Field of Classification Search
USPC .............................................................. 707/3
See application file for complete search history.

(56) References Cited

U.S. PATENT DOCUMENTS

| | | | | |
|---|---|---|---|---|
| 6,285,999 | B1 * | 9/2001 | Page | 707/5 |
| 6,473,752 | B1 | 10/2002 | Fleming, III | |
| 6,687,696 | B2 * | 2/2004 | Hofmann et al. | 707/6 |
| 6,801,909 | B2 * | 10/2004 | Delgado et al. | 707/4 |
| 7,257,577 | B2 * | 8/2007 | Fagin et al. | 707/7 |
| 7,260,573 | B1 * | 8/2007 | Jeh et al. | 707/7 |
| 2005/0071328 | A1 * | 3/2005 | Lawrence | 707/3 |
| 2005/0102282 | A1 * | 5/2005 | Linden | 707/3 |
| 2005/0216434 | A1 * | 9/2005 | Haveliwala et al. | 707/1 |
| 2005/0278317 | A1 * | 12/2005 | Gross et al. | 707/3 |
| 2006/0074883 | A1 * | 4/2006 | Teevan et al. | 707/3 |
| 2006/0112079 | A1 * | 5/2006 | Holt et al. | 707/3 |
| 2006/0129533 | A1 * | 6/2006 | Purvis | 707/3 |
| 2006/0155751 | A1 * | 7/2006 | Geshwind et al. | 707/102 |
| 2006/0200556 | A1 * | 9/2006 | Brave et al. | 709/224 |
| 2006/0242135 | A1 * | 10/2006 | Weare | 707/4 |

FOREIGN PATENT DOCUMENTS

| | | |
|---|---|---|
| EP | 1 462 952 A1 | 9/2004 |
| EP | 1 647 903 A1 | 4/2006 |

OTHER PUBLICATIONS

Chakrabarti, S et al., "Distributed Hypertext Resource Discovery Through Exampes", in Proceedings of the 25th VLDB Conference, Edinburgh, Scotland, 1999.
Dumais, S. et al., "Stuff I've Seen: A System for Perosnal Information Retrieval and Re-Use", SIGIR '03 Jul. 28-Aug. 1, 2003, Toronto, Canada.

(Continued)

*Primary Examiner* — Joshua Bullock
(74) *Attorney, Agent, or Firm* — Patrick J. S. Inouye; Krista A. Wittman

(57) ABSTRACT

Techniques are presented to provide personalized search results to a user. A user history optionally classified into projects or tasks is determined. A profile for the user is determined by identifying keywords, concepts or other user and/or task specific descriptors within user history documents. A proximal neighborhood based on the user's history and adjustable crawling parameters is determined. The adjustable crawling parameters define which documents linked to documents in the user history are included within the proximal neighborhood. A user query is determined and used to search the set of documents within the proximal neighborhood. The results are then ranked based on the user profile information. The ranked results are optionally displayed to the user.

36 Claims, 14 Drawing Sheets

(56) References Cited

OTHER PUBLICATIONS

Cutting, D., "Free Search", downloaded from http://nutch.sourceforge.net/blog/cutting.html, on Apr. 27, 2005.

Cho, J., et al., "Efficient Crawling Through URL Ordering", Computer Networks and ISDN Systems, 30(1-7):161-172, 1998.

Chakrabarti, S., et al. "Focused Crawling: a new approach to topic-specific Web resource discovery", Computer Networks, vol. 31, No. 11-16, 1999, p. 1623-1640, Reed Elsevier, Netherlands.

Russell, D., et al., "The Cost Structure of Sensemaking", Proceedings of the SIGCHI conference on Human factors in computing systems, Netherlands, Apr. 24-29, 1993, p. 269-276. ACM Press, New York, NY.

Sugiyama, K., et al., "Adapative Web Search Based on User Profile Constructed Without Any Effort From Users", in Proceedings of the WWW 2004, May 17-22, 2004, ACM, New York, NY.

Teevan, J. et al., "Personalizing Search via Automated Analysis of Interests and Activities", Proceedings of the 28th annual international ACM SIGIR conference on Research and development in information retrieval, Salvador Brazil, 2005, p. 449-456, ACM Press, New York, NY.

Pitkow, J., et al., "Personalized Search", Communications of the ACM, vol. 45, No. 9, 2002, ACM Press, New York, NY.

Aggarwal, C., "Collaborative Crawling: Mining User Experiences for Topical Resource Discovery", iProceedings of the eighth ACM SIGKDD international conference on Knowledge discovery and data mining. Edmonton, Alberta, 2002, p. 423-428, ACM Press, New York, NY.

Davison, B., "Topical Locality in the Web", in Proceedings of the 23rd annual international ACM SIGIR conference on Research and development in information retrieval, Athens, Greece, Jul. 24-28, 2000, p. 272-279, ACM Press, New York, NY.

European Patent Office Search Report, Aug. 1, 2006.

Young_Woo Seo et al., "Learning user's preferences by analyzing web-browsing behaviours" in Proceedings of the 4th Annual Conference on Autonomous Agents, v. conf 3, Jun. 3, 2000, pp. 381-387, New York, NY, Association for Computing Machinery.

Harmandas V et al., "Image retrieval by hypertext links", In Proceedings of the 20th Annual International ACM-SIGIR Conference on Research and Development in Information Retrieval, Jul. 27-31, 1997, pp. 296-303, Philadelphia, PA, Association of Computing Machinery.

Schecter S et al., "Using path profiles to predict HTTP requests", Computer Networks and ISDN Systems, vol. 30, No. 1-7, Apr. 1998, pp. 457-467, North Holland Publishing. Amsterdam, NL.

\* cited by examiner

| USER ID | PROFILE |
|---|---|
| 1345 | FTP://GROUP1.XYZ.ORG/USERS/1345/.USER_PROFILE |
| 1345 | FTP://GROUP1.XYZ.ORG/USERS/1345/.PROJECT0001 |
| 1345 | FTP://GROUP1.XYZ.ORG/USERS/1345/.PROJECT0002 |
| . | . |
| . | . |
| 9823 | FTP://GROUP2.ABC.ORG/USERS/9823/.USER_PROFILE |

FIG. 15

|  | USER PROFILE OF ANALYST | USER PROFILE OF OTHER |
|---|---|---|
| REVISIT | PERSONALIZATION/ DESKTOP SEARCH | KNOWLEDGE SHARING |
| DISCOVER | PROXIMAL SEARCH BASED DISCOVERY | COLLABORATIVE DISCOVERY |

FIG. 16

SYSTEMS AND METHODS FOR PERSONALIZED SEARCH

This application claims the benefit of Provisional Patent Application No. 60/676,462 filed Apr. 29, 2005, the disclosure of which is incorporated herein by reference, in its entirety.

This invention was made with U.S. government support under ARDA NIMD Contract No. #MDA904-03-C-0404. The U.S. government may have certain rights in the invention.

BACKGROUND OF THE INVENTION

1. Field of Invention

This invention relates to information retrieval.

2. Description of Related Art

Search engines provide a view into the wealth of constantly changing resources available over the web, intranets, file servers and other dynamic information repositories. Conventional personalized search systems facilitate the retrieval of previously accessed information by personalizing the search results based on a user profile.

Thus, the system described by Dumais' et al, in "Stuff I've Seen: A System for Personal Information Retrieval and Reuse", 26th Annual International ACM SIGIR Conference, Jul. 28-Aug. 1, 2003, and Google's desktop search system integrate web and file search functions into a single system that helps retrieve previously accessed information. Although useful, these systems are not focused on discovering new-unseen information relevant to the user's current information retrieval goals.

SUMMARY OF THE INVENTION

Thus, systems and methods for personalized search would be useful. The system and method according to this invention determine personalized search results. A user history optionally classified into projects or tasks is determined. A profile for the user is determined by identifying keywords, concepts or other descriptors of the user within user history documents. A proximal neighborhood based on the user's history is determined. The proximal neighborhood is determined based on adjustable crawling parameters. The adjustable crawling parameters define which documents, linked to the user history are included within the proximal neighborhood. A user query is determined and used to search the proximal neighborhood. The results of the search over the proximal neighborhood are ranked based on user profile information and optionally displayed to the user.

BRIEF DESCRIPTION OF THE DRAWINGS

FIG. 15 is an exemplary data structure for storing task profiles according to an aspect of this invention;

FIG. 16 is a table illustrating the use of the accumulated user profile and proximal neighborhood information according to an aspect of this invention.

DETAILED DESCRIPTION OF EXEMPLARY EMBODIMENTS

Figure 1:
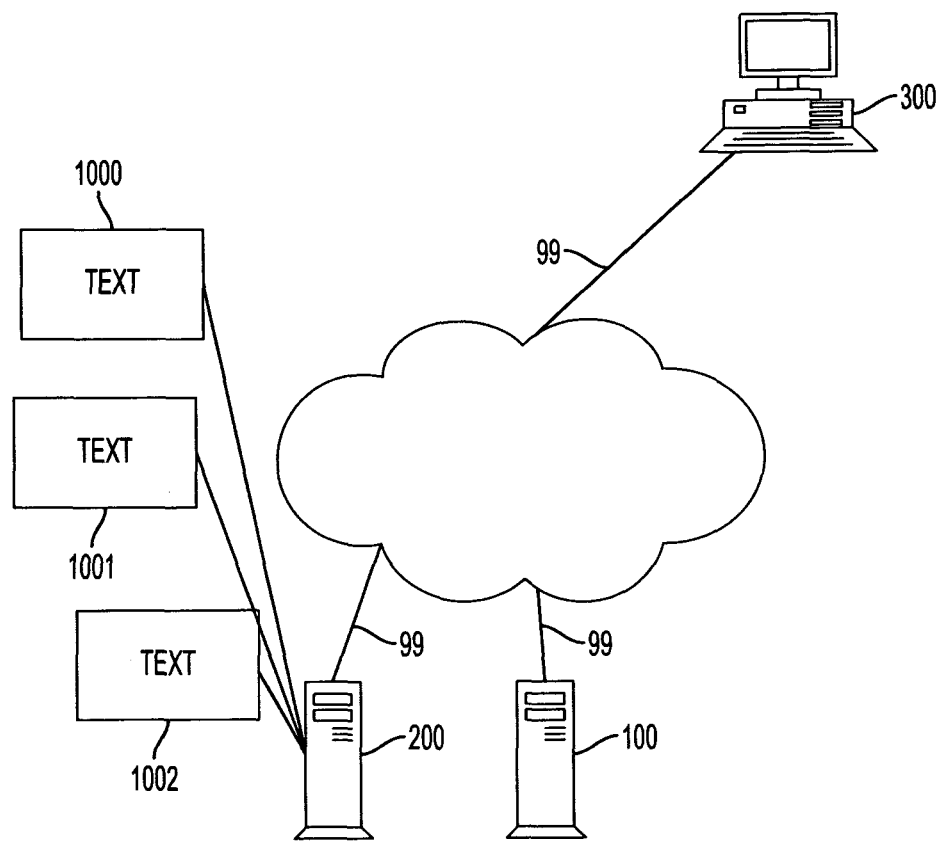
FIG. 1 is an overview of an exemplary first system for personalized search 100 according to an aspect of this invention.

FIG. 1 is an overview of an exemplary first system for personalized search 100 according to an aspect of this invention. The system for personalized search 100 is connected via communications link 99 to a communications-enabled personal computer 300 and an information repository 200 providing access to documents 1000-1002.

A user of the communications-enabled personal computer 300 initiates a query for documents. A search history is retrieved. The search history may be retrieved from an internet browser, a proxy server that mediates document access, a library manager and/or any known or later developed source of user information retrieval transactions. A proximal neighborhood of documents is determined based on the user history. The proximal neighborhood comprises documents linked within a threshold link distance of previously accessed documents. In various exemplary embodiments, the threshold link distance is set to a default value of 2. The threshold link distance is optionally adjustable by the user or may be adjusted under program control. The documents in the information repository within a threshold link distance of previously accessed documents are added to the proximal neighborhood. The documents in the proximal neighborhood reflect documents likely to be topically related to documents retrieved by the user. However, the documents in the proximal neighborhood have not yet been seen by the user. A user profile is determined based on the documents in the user history. The user profile is a description of the keywords relevant to the prior information retrieval tasks.

The system for personalized search 100 applies the user query to search the documents in the proximal neighborhood associated with the user. The search result is ranked based on the user profile. The ranked search results are then returned via the communications links 99 to the user of the communications-enabled personal computer 300. In various exemplary embodiments according to this invention, the proximal neighborhood of the user is dynamically adjusted as the user history changes.

Figure 2:
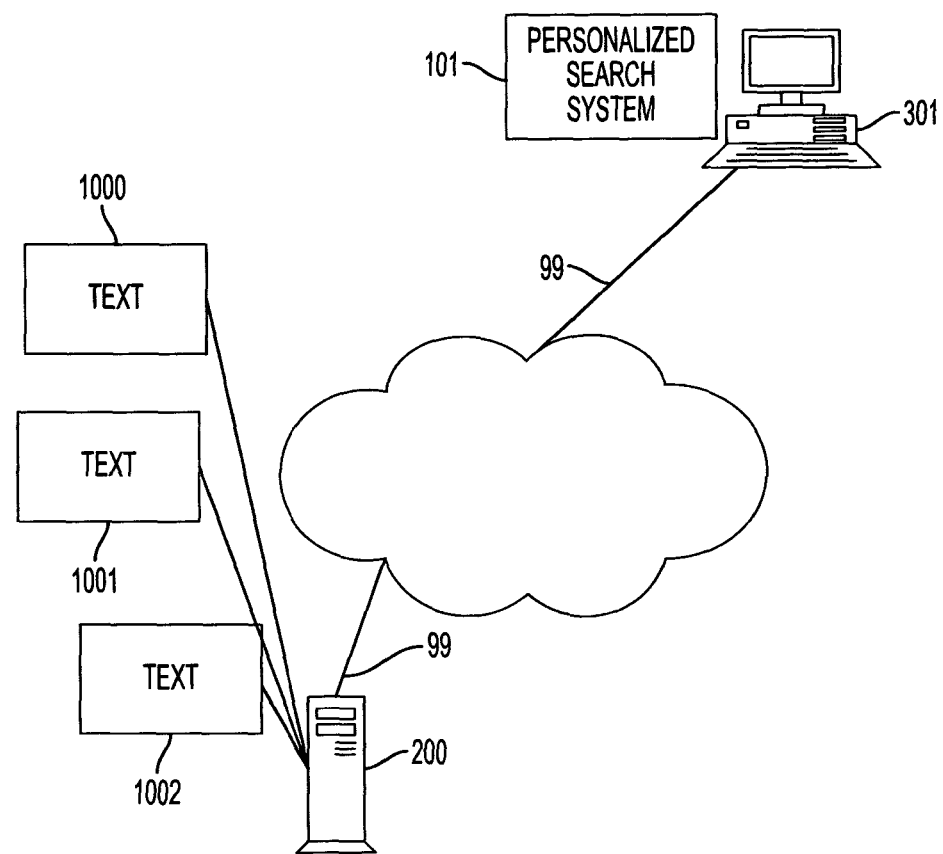
FIG. 2 is an overview of an exemplary second system for personalized search 101 according to an aspect of this invention.

FIG. 2 is an overview of an exemplary second system for personalized search 101 according to an aspect of this invention. A system for personalized search 101 is embedded within a communications-enabled personal computer 301. The communications-enabled personal computer 301 is connected via the communications links 99, to an information repository 200 providing access to documents 1000-1002.

In various exemplary embodiments, the second system for personalized search 101 is implemented as a software routine, hardware circuit or other device within the second communications-enabled personal computer 301. The second system for personalized search 101 maintains an updated user history of document and/or other information accessed by the user. The second system for personalized search 101 is embedded within the communications-enabled personal computer 301, thus the second system for personalized search 101 has access to a a greater range and number of user history sources including email, browser history, file access history and the like. Crawling parameters are entered by the user or retrieved from storage. For example, in one embodiment, a threshold link distance is entered by the user. In various other exemplary embodiments, the threshold link distance value is retrieved from a memory or other storage device. The crawling parameters and/or threshold link distance define the size of the user's proximal neighborhood. The unseen documents within the threshold link distance of documents in the user history are then added to the proximal neighborhood. A user profile is determined based on the documents in the user history. The user profile describes the user history transactions.

The user query is applied to the documents within the proximal neighborhood. The search result reflects documents topically related to the user's previous search history but which are further focused by the terms of the current user query. It will be apparent that in various other exemplary embodiments according to this invention, the query search may be expanded to include documents outside the user's proximal neighborhood. For example, a first user may select a second user's proximal neighborhood and/or user profile to perform a search. In still other exemplary embodiments according to this invention, one or more user profiles and/or proximal neighborhoods are combined using union, intersection and various other operators to perform personalized searches. A ranking function is then applied to the search results. The ranking function is based on a user profile. Thus, documents in the proximal neighborhood that more closely match user interests are ranked higher than other documents. In some exemplary embodiments, a tag or other marker is optionally added to the newly identified documents. The ranking may be further adjusted based on explicit user interest terms, information scent or the like. The ranked proximal search result is then returned over the communications link 99 to the user of the second communications-enabled personal computer 301.

Figure 3:
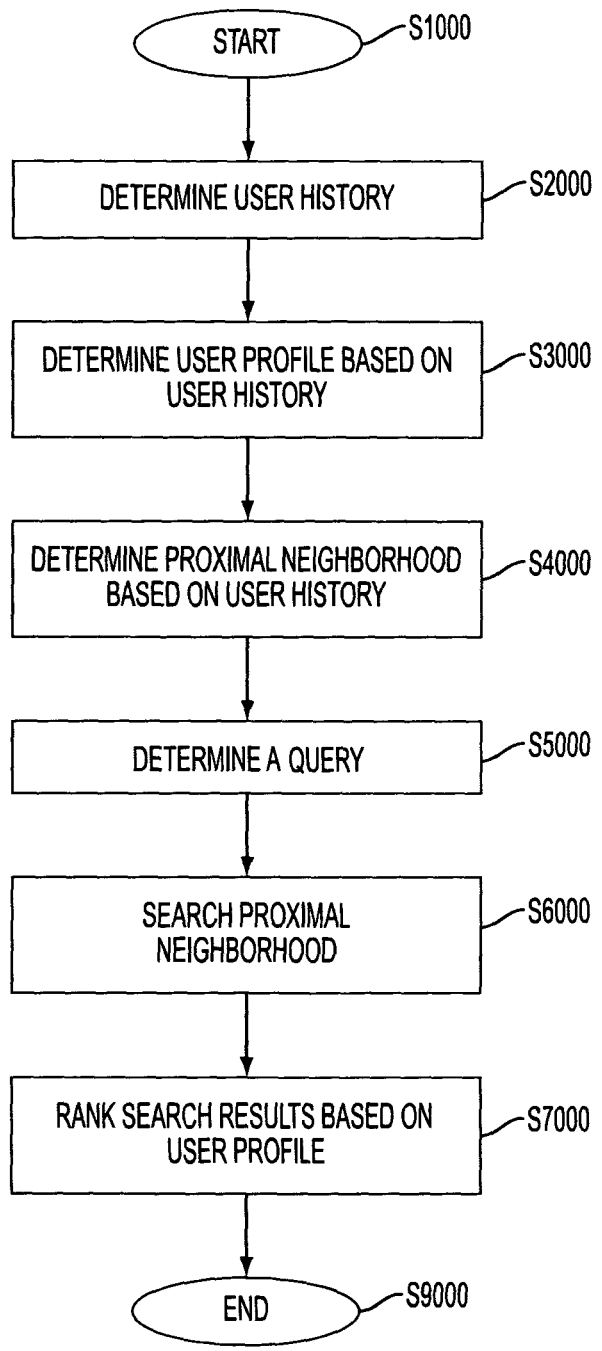
FIG. 3 is a flowchart of an exemplary method for personalized search according to an aspect of this invention.

FIG. 3 is a flowchart of an exemplary method for personalized search according to an aspect of this invention. The process begins at step S1000 and immediately continues to step S2000.

In step S2000, a history for a user is determined. The user history reflects the prior information access transactions of the user. For example, the history file of a web browser may be configured to indicate the uniform resource locators (URLs) accessed by the user. The user browser history is retrieved directly from the user's browser, an organizational web portal, a web proxy server, a library access manager, the access logs of a web server and/or any known or later developed source of historical user transactions. In various exemplary embodiments according to this invention, the user history information is further categorized by task, project and the like. The categorization of the user history by tasks provides a method for identifying the resources used to complete the task. Categorizing the user history based on tasks, project and/or other attributes also provides a flexible mechanism for sharing and/or re-using information across group and organizational boundaries. After the user history has been determined, control continues to step S3000.

In step S3000, a user profile is determined. The user profile is based on a user history. Word-stemming and stop-word removal is performed on documents in the user history. Optional thresh-holding is applied to identify descriptive keywords for the categorized information retrieval tasks and/or the user history as a whole. In one exemplary embodiment, the memory required to store the user profile is reduced by limiting the user profile to a subset of the keywords. A user profile vector or other representation is determined based on the user profile keywords. The user profile vector provides a compact representation of user interests. After the user profile has been determined, control continues to step S4000.

In step S4000, the proximal neighborhood is determined. The proximal neighborhood is based on a user history. The proximal neighborhood reflects linked but unseen documents that are within a threshold link distance of documents already accessed by the user. The links to documents already accessed by the user indicate that the documents are likely to be topically related to the interests of the user. The user history includes transactions related to having World Wide Web documents, accessing documents in a digital library, retrieving documents via ftp, http, or the like, retrieving documents through an internet portal and/or retrieving documents from any known or later developed source of historical user transactions. After the proximal neighborhood as been determined, control continues to step S5000.

A user query is determined in step S5000. The user query is a description of the specific information needs of the user. The user query is optionally expanded into relevant and/or associated terms, abstracted into a conceptual description or the like. After the user query has been determined, control continues to step S6000.

In step S6000, the proximal neighborhood associated with the user is searched using the query. The proximal neighborhood reflects documents that have not been seen by the user but which are likely to be of interest since they are within a threshold link distance of previously accessed documents. Documents in the proximal neighborhood that match the user query are returned in the personalized search result. After the proximal neighborhood of the user has been searched, control continues to step S7000.

In step S7000, the personalized search results are ranked based on the user profile. The profile ranking of the search results places information of specific relevance to the previously performed tasks at the top of the user's personalized search results. In various other embodiments, the location of a document within the proximal neighborhood, and/or various other attributes and features are used to further rank the search results. After the personalized search results have been ranked, control continues to step S8000. Control then continues to step S9000 and the process ends.

Figure 4:
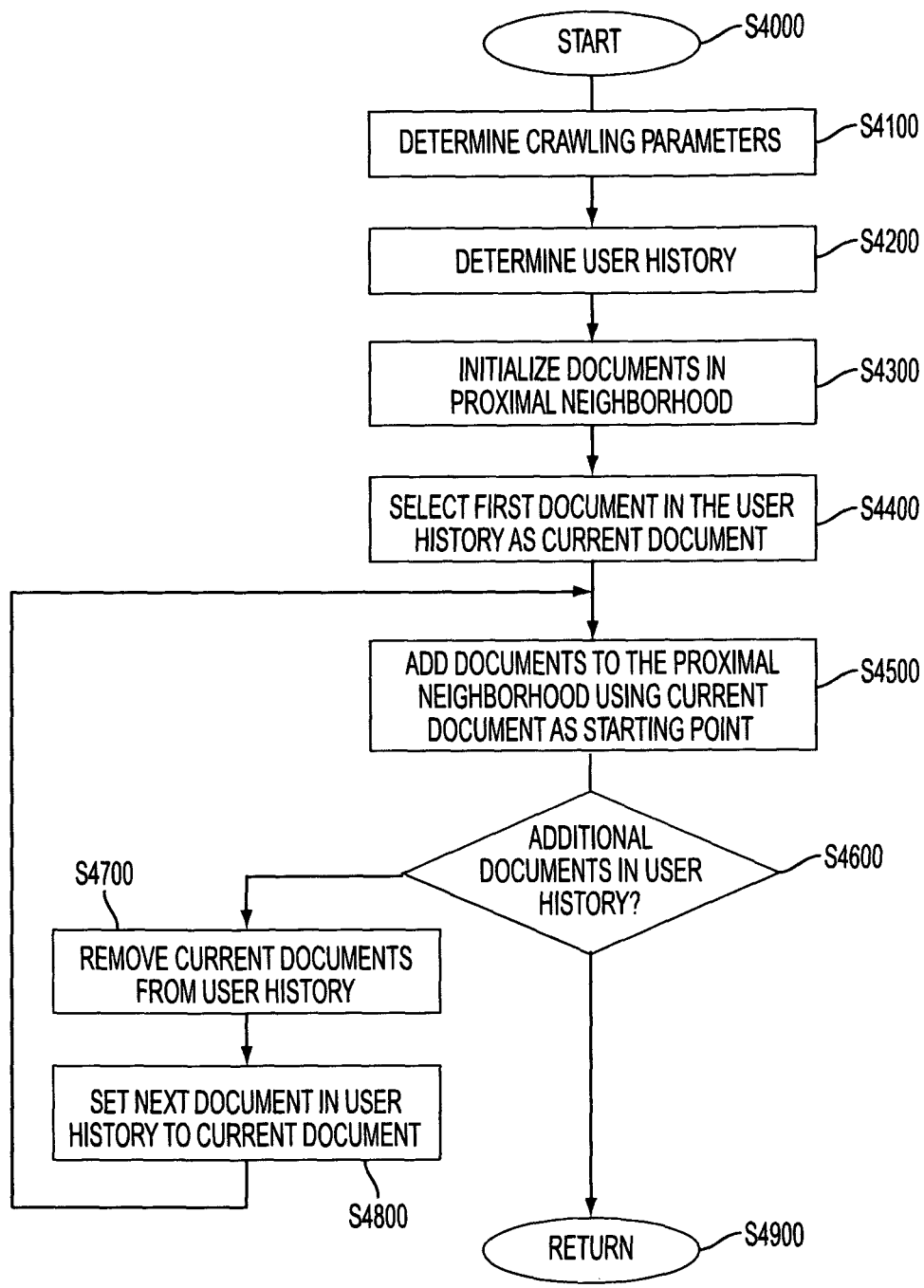
FIG. 4 is an expanded flowchart of an exemplary method for determining proximal neighborhoods according to an aspect of this invention.

FIG. 4 is an expanded flowchart of an exemplary method for determining proximal neighborhoods according to an aspect of this invention. The process begins at step S4000 and immediately continues to step S4100.

The crawling parameters are determined in step S4100. The crawling parameters include, but are not limited to: how the proximal documents are identified and how many links away a proximal document is from an accessed document. For example, in a breadth first search environment, a value of 2 provides a good link threshold distance. Thus, linked documents that are within 2 links of an accessed document are included within the proximal neighborhood. It will be apparent that other crawling parameters such as a link ranking function, the backlink ranking function, breadth-first search and/or any known or later developed link ranking and/or ordering strategy may also be used in the practice of this invention.

In some embodiments, a closed set of documents is defined. The documents in the closed set are linked or interconnected when the document is added to the set or collection. In still other exemplary embodiments, the interconnections between documents are not known. Thus, a crawler or other retrieval mechanism is used to determine the documents in the world-wide-web that are linked to the current document. The number of links to follow defines the proximal neighborhood. Moreover, different types of crawling algorithms, such as breadth first search, link ranking, backlink and various other graph search strategies may also be used to determine documents within the proximal neighborhood. After determining the crawling parameters, control continues to step S4200.

The user history is determined in step S4200. The user history provides a record of the documents previously viewed by the user. The user history information is retrieved from the user's browser, a web proxy access log, a library access manager and/or any known or later developed source of historical transaction information about a user. For example, in one embodiment, the user history is a sequence of information resource locators or URLs. The URLs indicate the specific documents accessed by the user in performing an information retrieval task. Thus, the URLs reflect a record of how the information requirements for the task were satisfied. After determining the user history information, control continues to step S4300.

The set of documents within the proximal neighborhood is optionally initialized or updated in step S4300. That is, when a user first accesses the system for personalized search, the proximal neighborhood is optionally initialized to the empty set and contains no documents. However, once the user has accessed the system for personalized search, the proximal neighborhood information is optionally saved or stored within a memory. In subsequent sessions, new user history transactions are identified. The new user history transactions are used to update the proximal neighborhood associated with the user. After the proximal neighborhood has been initialized or updated, control continues to step S4400.

In step S4400, a first document is selected from the user history. After the first document is selected, control continues to step S4500.

Documents are added to the proximal neighborhood using the current document as the starting point in step S4500. Thus, if an open set of documents such as the World-Wide-Web is specified, an optional crawler is used to add linked but unseen documents based on the specified crawling parameters. The crawling parameters include, but are not limited to: a threshold link distance, the type of link crawling strategy or the like. If a closed document set is specified, then the optional crawling is not required. The unseen linked documents within a threshold link distance of the current document are added to the set of documents in the proximal neighborhood. After the proximal neighborhood has been determined, control continues to step S4600.

In step S4600 a determination is made as to whether there are additional documents in the user history. If it is determined that there are additional documents in the user history, control continues to step S4700. In step S4700, the current document is removed from consideration. For example, in one exemplary embodiment, the current document is removed from the working set or agenda of user history documents. In other embodiments, a flag is set to indicate the current history document has been removed from further consideration. Control then continues to step S4800.

The current document is set to the next document in the user history in step S4700. Control then jumps directly to step S4500. Steps S4500-S4700 repeat until it is determined in step S4600 that there are no additional documents remain in the user history. When it is determined that there are no additional documents in the user history, control continues to step S4900. The process returns and immediately continues to step S5000 of FIG. 3.

Figure 5:
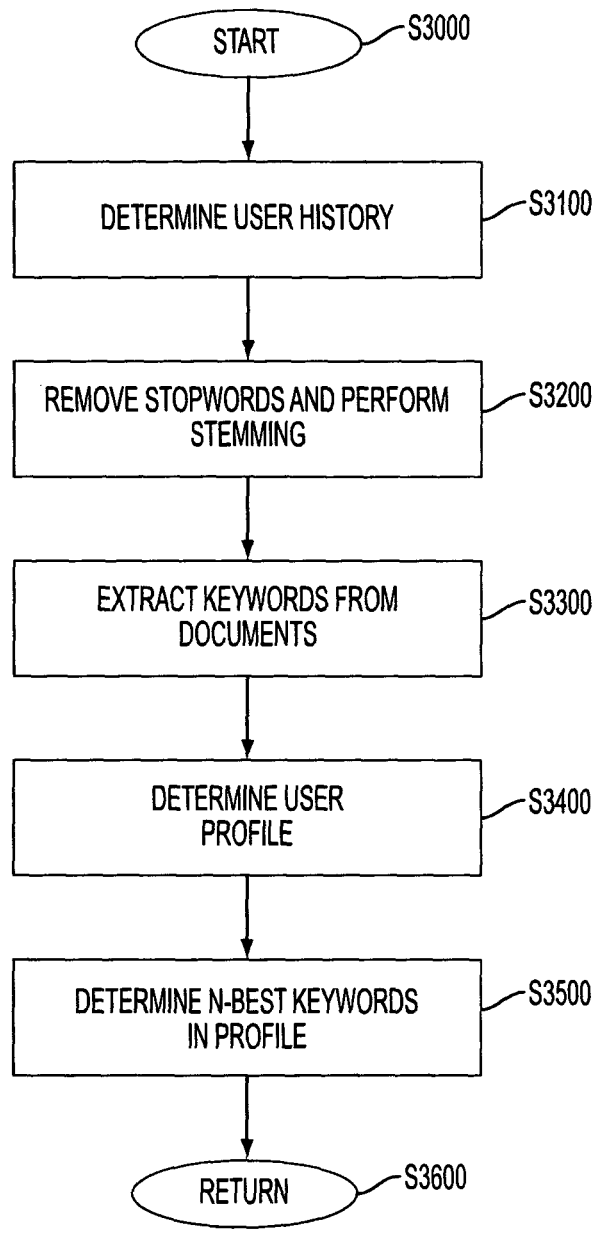
FIG. 5 is a flowchart of an exemplary method for determining a user profile according to an aspect of this invention.

FIG. 5 is a flowchart of an exemplary method for determining a user profile according to an aspect of this invention. The process begins at step S3000 and immediately continues to step S3100.

In step S3100, a history of user transactions is determined. The user history reflects the documents accessed by the user during previous information retrieval tasks. The previously accessed user history information provides a model of the user's information retrieval behavior. In various exemplary embodiments according to this invention, the user history is further categorized and associated with individual tasks, projects and the like. The resultant task specific user history reflects the documents and/or other information elements relevant to the user's task. It will be apparent that the user history can be categorized to any degree of granularity without departing from the scope of this invention. After the user history information has been determined, control continues to step S3200.

The stop-words are removed, words are stemmed and other normalizing functions are performed on the documents in the user history in step S3200. After the stop-word removal and word-stemming, control continues to step S3300.

In step S3300, the keywords are extracted from the documents. For example, words in the user history documents are analyzed to determine descriptive keywords of the information retrieval tasks performed. After the keywords have been determined, control continues to step S3400.

In step S3400, the user profile is determined based on the determined keywords or terms. In one exemplary embodiment according to this invention, a user profile vector is determined by weighting each keyword $v_i$ based on the formulae:

$$v_i = \frac{1}{|History|} \sum_{d \in History} \frac{\sqrt{tf_{t,d}} \cdot idf_t}{\sqrt{length_d}} \quad (1)$$

where $$idf_t = \ln\left[\frac{\#docs}{df_t + 1}\right] + 1 \quad (2)$$

and where d is the current document within the set of user history documents History. The term $df_{t+1}$ reflects the frequency of the term t+1 in the user history document d and the term |History| reflects the length of the user history. The term $idf_t$ is the inverse frequency of the term t within the set of user history documents and $length_d$ is the length of the document. The resultant weighted keywords are used to form a user profile vector. The user profile may include high frequency concepts that appear in the user history. However, it will be apparent that various other user profile representations may also be used without departing from the scope of this invention. After the user profile has been determined, control continues to step S3500.

The keywords in the user profile are determined based on a threshold in optional step S3500. For example, in one exemplary embodiment according to this invention, the best 1000 or set of N-best keywords are selected. After the keywords have been selected, control continues to step S3600. Control returns and immediately continues to step S4000 of FIG. 3.

Figure 6:
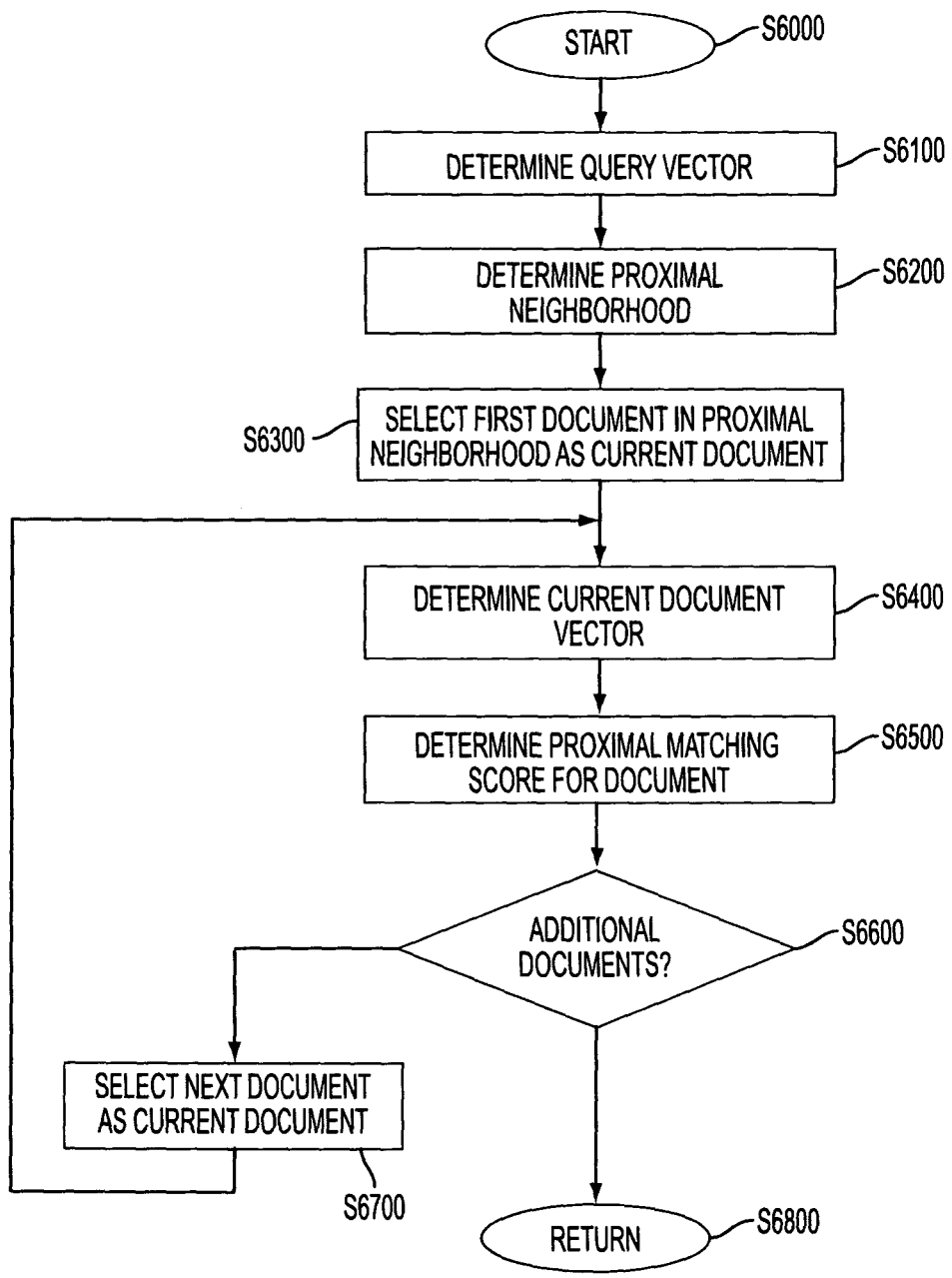
FIG. 6 is a flowchart of an exemplary method for searching proximal neighborhoods according to an aspect of this invention.

FIG. 6 is a flowchart of an exemplary method for searching proximal neighborhoods according to an aspect of this invention. The process begins at step S6000 and immediately continues to step S6100.

In step S6100, a query is determined. The query may be a vector comprised of query terms, a list of keywords, a portion of natural language or the like. The query reflects the particular information needs of the user. The query may be formulated as a set of terms, terms from a paragraph of text, terms from a natural language question and the like. The query terms are optionally expanded using thesauri, WordNet lookups and/or various other methods. An optional relevance or other threshold is used to select a subset of the expanded query terms. After the query has been determined, control continues to step S6200.

The proximal neighborhood associated with the user and/or the task is determined in step S6200. In one exemplary embodiment according to this invention, a previously compiled proximal neighborhood is retrieved from a storage device. In still other embodiments, the proximal neighborhood is dynamically determined from the user history for each session. After the proximal neighborhood has been determined, control continues to step S6300.

In step S6300, a document in the proximal neighborhood is selected as the current document. Control then continues to step S6400 where the document vector for the current document is determined. After the document vector has been determined, control continues to step S6500.

The proximal matching score is determined between the current document in the proximal neighborhood and the query vector in step S6500. In one exemplary embodiment, an exemplary proximal matching score is determined based on the formula:

$$\text{proximal\_score} = \frac{|Q \cap D|}{|Q|} \sum_{t \in Q} \frac{\sqrt{tf_{t,d}} \cdot idf_t}{\sqrt{length_d}} \frac{\sqrt{tf_{t,q}} \cdot idf_t}{\sqrt{\sum_{t \in Q}(tf_{t,q} \cdot idf_t)^2}} boost_t \quad (3)$$

where Q is a query, D is the document, $|Q \cap D|$ reflects the number of common terms between the query Q and the document D, and $|Q|$ reflects the number of terms in the query and the term $boost_t = v_i$ from the user profile calculated in formula (1) above. The importance of the term in the user profile is used to calculate the proximal score. It will be apparent however that other proximal scoring functions that indicate the similarity between the query, and proximal documents may also be used in the practice of this invention. After the proximal matching score has been determined, control continues to step S6600.

In step S6600, a determination is made as to whether there are additional documents to be searched. If it is determined that there are additional documents in the proximal neighborhood, control continues to step S6700. The next document in the proximal neighborhood is then selected as the current document. Control then jumps immediately to step S6400. Steps S6400-S6700 are repeated until it is determined in step S6600 that there are no additional documents to be searched. When it is determined in step S6600 that there are no additional documents to search, control continues to step 6800. Control then returns and immediately jumps to step S7000 of FIG. 3 where the proximal scores may be used to rank the documents in the proximal neighborhood for presentation to the user.

Figure 7:
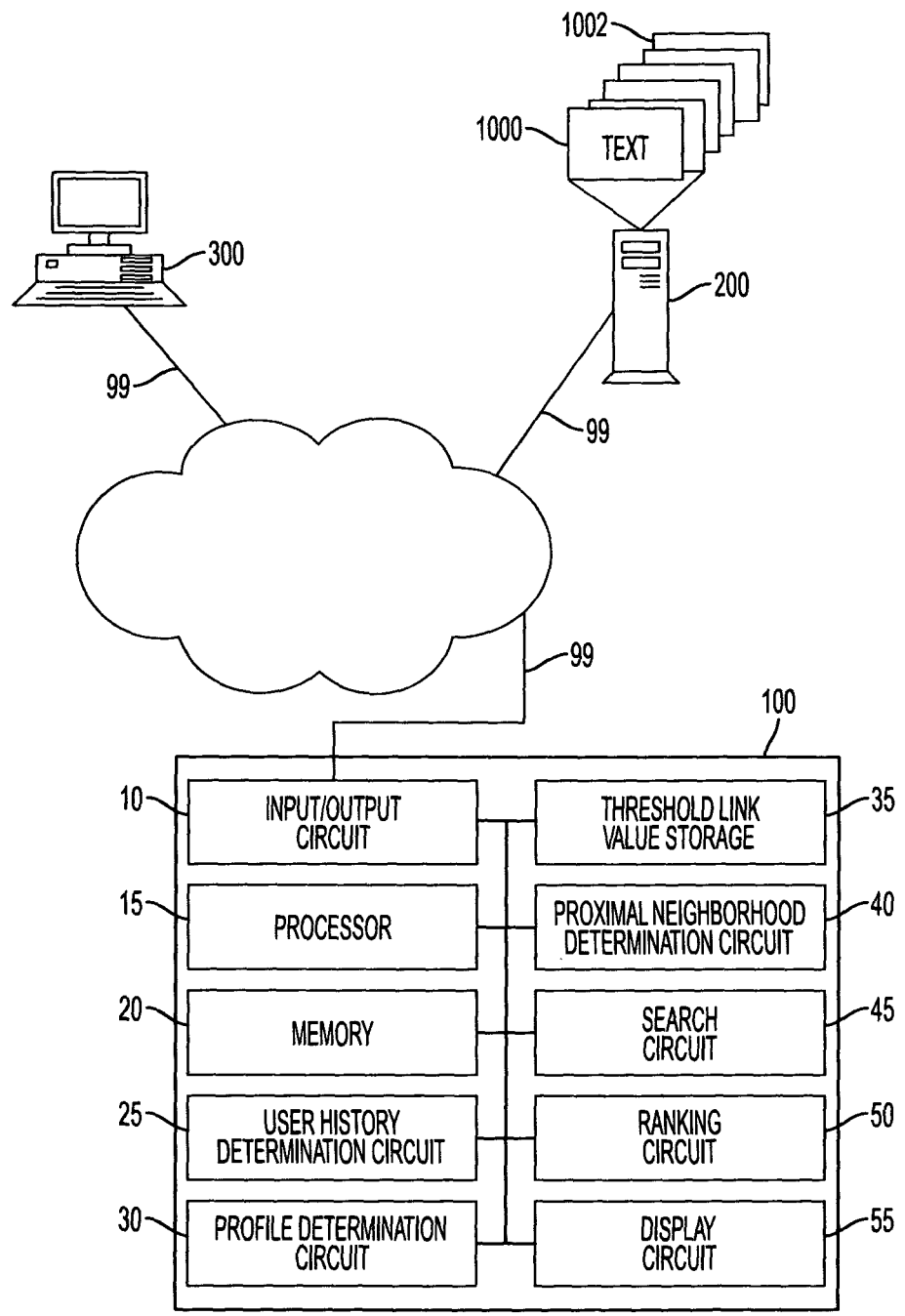
FIG. 7 is an exemplary system for personalized search according to an aspect of this invention.

FIG. 7 is an exemplary system for personalized search 100 according to an aspect of this invention. The system for personalized search 100 is comprised of: a processor 15; a memory 20; a user history determination circuit 25; a profile determination circuit 30; threshold link value storage 35; a proximal neighborhood determination circuit 40; a search circuit 45; a ranking circuit 50; and an optional display circuit 55; each connected to an input/output circuit 10 and via a communications link 99 to a communications enabled personal computer 300; and an information repository 200 providing access to document 1000-1002.

The user of the communications-enabled personal computer 300 submits a query against documents 1000-1002 in the information repository 200. The query is forwarded over communications links 99 to the system for personalized search 100. The system for personalized search 100 mediates access to the information repository 200. The system for personalized search 100 activates the input/output circuit 10 to retrieve the query. The processor 15 determines the user based on the user initiating the query or other identifier. That is, a first user may desire to search using the use profile and/or the proximal neighborhood associated with a different user, group of users, organizations and the like. The relevant user may be a user different than the search initiator. Moreover the user may be a group of users and the like. In various embodiments, a user login sequence, an internet protocol (IP) address and the like are used to identify the user. However, it should be apparent that various user identification methods may be used in without departing from the spirit or scope of this invention.

The user identifier is used by the processor 15 to request and/or determine the user history. The user history is retrieved from an information repository, entered by the user and/or determined dynamically. The user history is then stored in the memory 20. In one embodiment, the user history information is indicated by a list of uniform resource locators (URL) associated with the user's paths within the information repository.

The processor 15 retrieves the link threshold distance from the threshold link distance value storage 35. The processor 15 then activates the proximal neighborhood determination circuit 40 to determine documents in the information repository 200 within the threshold link distance of documents previously accessed by the user. In one embodiment, the proximal neighborhood determination circuit 40 initializes the set of proximal neighborhood documents to the empty set. A copy of the user history is then retrieved. A first document is selected from the copy of the user history. Each linked document within a threshold link distance of the selected document is added to the set of documents in the proximal neighborhood. The selected document is then removed from the copy of the user history. A second document is then selected from the modified copy of the user history and the process repeats until no documents remain in the copy of the user history. In one embodiment according to this invention, the process is repeated for each new document accessed by the user. However, it will be apparent that in various other embodiments, processing of user history information is performed on batches as additional documents are added to the user history, under user and/or programmatic control. The incremental determination of proximal neighborhood documents reduces the burden on computational resources.

The processor 15 activates the search circuit 45 to search for documents in the proximal neighborhood that match the query. The documents in the proximal neighborhood reflect unseen documents that are likely to be closely related to the interests of the user since they are linked to previously accessed documents.

The processor 15 activates the user profile determination circuit 30 to determine the user profile based on the user history. The user profile reflects a description of the prior documents accessed during information retrieval tasks.

The processor 15 then activates the ranking circuit 50 to rank the personalized search results based on the user profile. In one exemplary embodiment according to this invention, the ranking of the search results is further adjusted based on document location with the proximal neighborhood and/or various other indicators. The optional display circuit 55 is then activated to format the display of the personalized search results for the user. The search result is then forwarded over the communications links 99 and displayed on the communications enabled personal computer 300.

Figure 8:
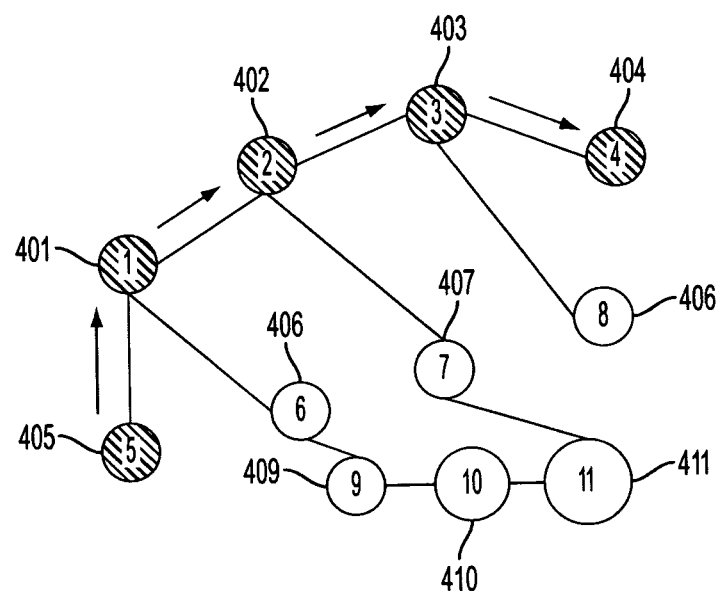
FIG. 8 is a visualization of documents within an information repository according to an aspect of this invention.

FIG. 8 is a visualization of documents within an information repository according to an aspect of this invention. The documents of the information repository are visualized as nodes 1-11, 401-411. A user history or path within the set of documents is indicated by the arrows between the nodes 1-5, 401-405. For example, the user first accessed the document indicated by node 5, 405 followed by nodes 1-4 401-404. The user did not access the documents indicated by nodes 6-1, 406-411. It will be apparent that in various exemplary embodiments according to this invention, the system for personalized search retrieves documents within a threshold link distance of documents previously accessed by the user. In various other exemplary embodiments, the links between documents are defined when the document is added to the library. Thus, pre-fetching or crawling is not required in these closed environments. The nodes 6-11, 406-411 are linked to nodes 1-5, 401-405 reflecting corresponding links between the documents. Thus, the documents represented by nodes 6-11, 407-410 are likely to be topically related to the documents in the user history represented by the nodes 1-5, 401-405.

Figure 9:
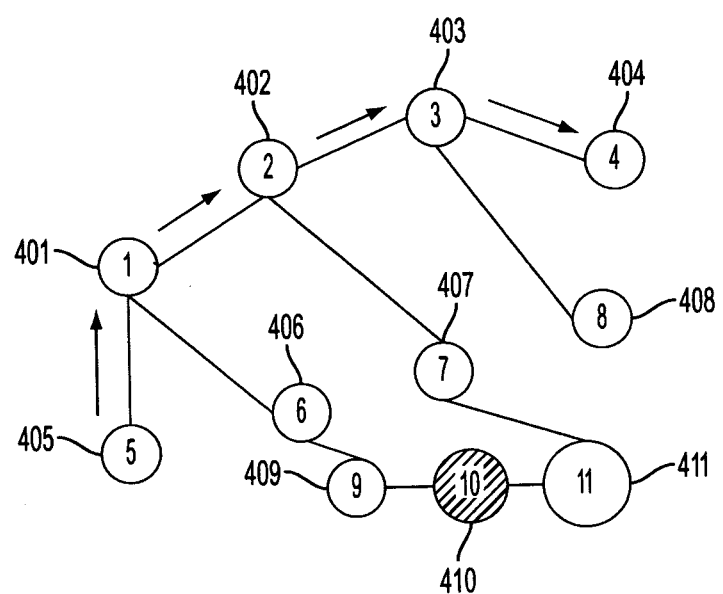
FIG. 9 is an exemplary first visualization of documents that are more than a threshold link distance away from the user history documents according to an aspect of this invention.

FIG. 9 is an exemplary first visualization of documents that are more than a threshold link distance away from the user history documents according to an aspect of this invention. The node 10, 410 reflects a node more than 2 links away from the user history node 1-5, 401-405. That is, linked node 10, 410 is more than the threshold link distance away from a user accessed node and is therefore not part of the proximal neighborhood.

Figure 10:
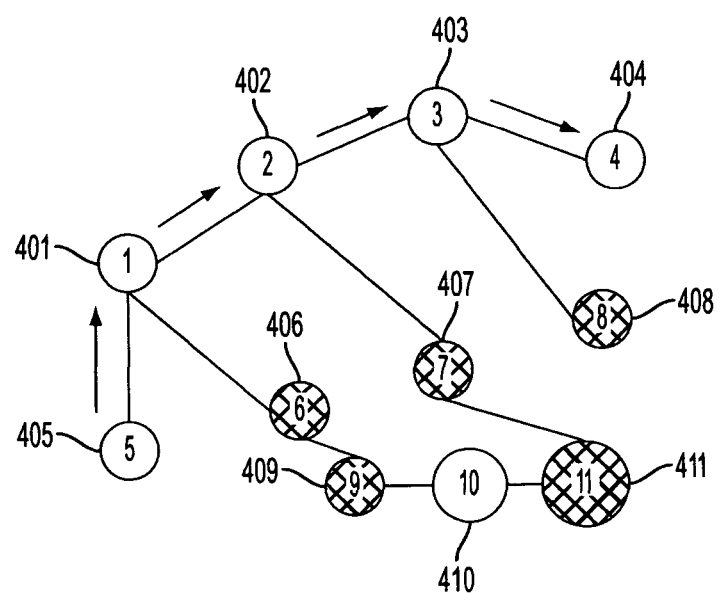
FIG. 10 is an exemplary visualization of documents that are within a threshold link distance of user history documents according to an aspect of this invention.

FIG. 10 is an exemplary visualization of documents that are within a threshold link distance of user history documents according to an aspect of this invention. The nodes 6-9 and 11, 406-411 and 411 reflect documents that are within 2 links of the user history nodes 1-5, 401-405. For example, node 6, 407 is 1 link away from node 1, 401 which was previously accessed by the user. The nodes 7, 407 and node 8, 408 are each within 1 link of node 2, 402 and node 3, 403 respectively. Therefore nodes 7, 407 and node 8, 408 are added to the proximal neighborhood. Node 9, 409 and node 11, 411 are within 2 links of node 1, 401 and node 2, 402. Thus, nodes 1-2, 401-402 are within the threshold link distance and are therefore also added to the proximal neighborhood. Node 10, 410 is not included in the proximal neighborhood since node 10 is 3 links away from the closest user history document.

Figure 11:
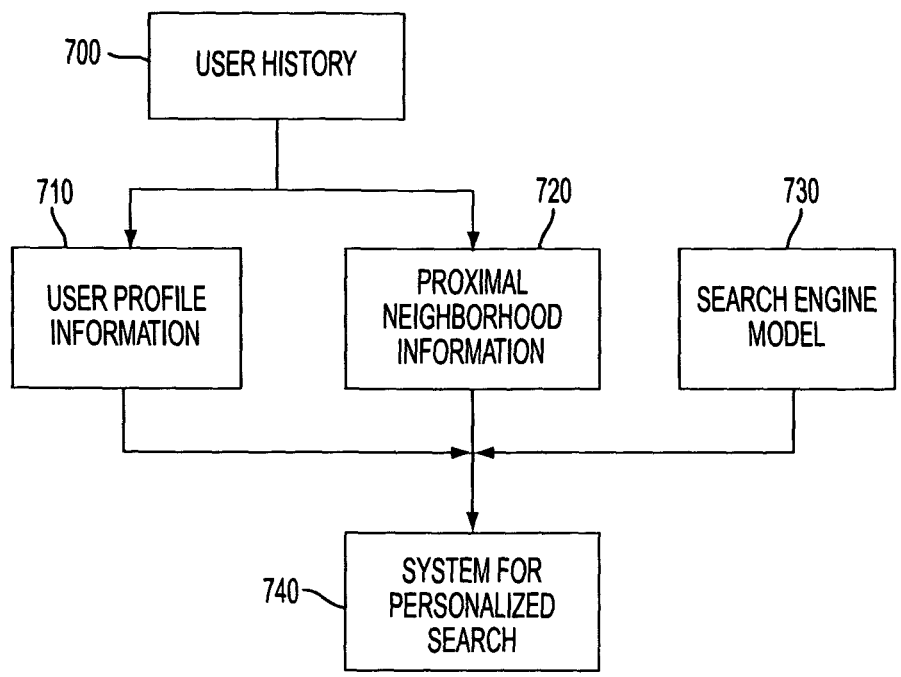
FIG. 11 is an overview of the formation of a system for personalized search according to an aspect of this invention.

FIG. 11 is an overview of the formation of a system for personalized search according to an aspect of this invention. The user history information 700 is retrieved from various sources of transactional information describing the user. The user history information 700 may include, browser history, access patterns within a local file system, email information and/or any other information useful in discerning past user information retrieval transactions.

The user history information 700 is transformed to form user profile information 710. In some exemplary embodiments, the user profile information 710 is determined by removing stop-words and performing word-stemming. The resultant keywords provide a compact description of the user history. The user profile is optionally truncated to a default number of keywords. In various embodiments, a user profile vector is formed. The user profile vector is then stored as the user profile information 710.

The user history information 700 is also used to determine the proximal neighborhood information 720. Each document, node or information element within the user history information 720 is examined. Document, nodes or other information elements linked within a defined threshold link distance of a user history document, node or information element, are retrieved to form the proximal neighborhood. The documents in the proximal neighborhood are linked to previously accessed documents and are therefore likely to be topically related to one of the user's previous information retrieval tasks. However, the proximal neighborhood documents reflect information that has not yet been seen by the user. Thus, these topically related, but as yet unseen documents are likely to be useful to the user.

The search engine model 730 reflects a customizable search engine model that can be personalized for the user. In one exemplary embodiment according to this invention, Douglas Cutting's "Nutch" open source web-search engine, described at http://incubator.apache.org/nutch/about.html, is used as an exemplary customizable search engine model. However, it should be apparent that various other search engine models can also be used in the practice of this invention.

The user profile information 710, the proximal neighborhood information 720 and the customizable search engine model 730 are combined to form a system for personalized search 740 for the user. The system for personalized search 740 is able to exploit personal information already known about the user's prior information access patterns and the user profile information 710 to select and/or suggest information likely to be relevant to current information retrieval tasks.

Figure 12:
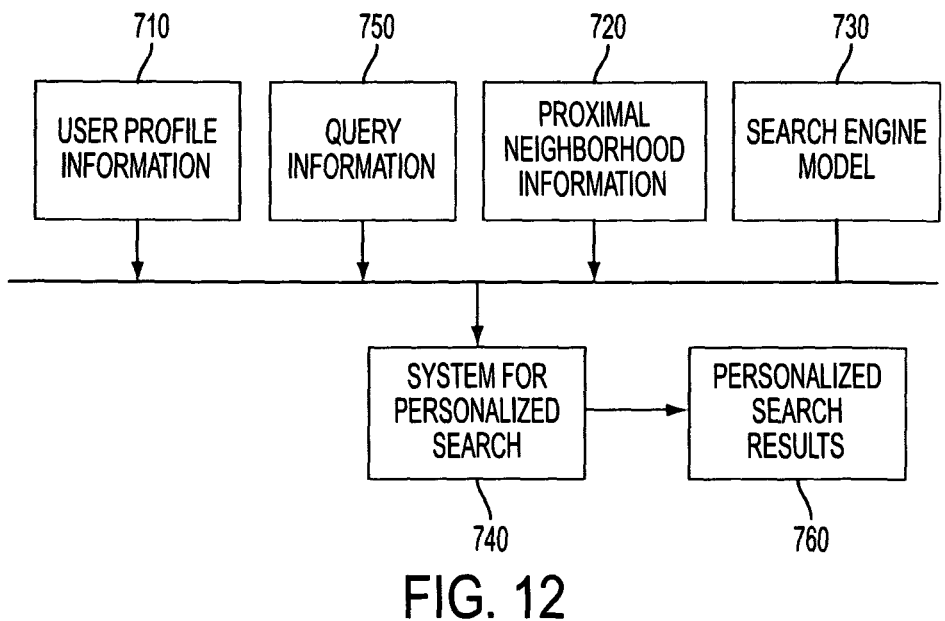
FIG. 12 is an overview of an exemplary query using a system for personalized search according an aspect of to this invention.

FIG. 12 is an overview of an exemplary query using a system for personalized search 740 according an aspect of to this invention. A user is identified or determined. The proximal neighborhood information 720 and a user profile 710 are determined based on the identified user. A search engine model 730 is personalized with the user profile information 710. The personalized search engine searches the documents in the proximal neighborhood for matches with the query information 740. The results of the search are ranked based on the user profile information 710 to provide personalized search results 760. The personalized search results 760 reflect documents likely to be topically related to user's interest based since the searched collection is the proximal neighborhood of documents linked to prior user transactions. The user profile information provides a ranking that focuses user attention on documents most likely to be helpful in the user's information retrieval tasks. In various embodiments, the user profile is classified by projects and tasks. This allows the search results to be further ranked based on relevance specific projects or tasks.

Figure 13:
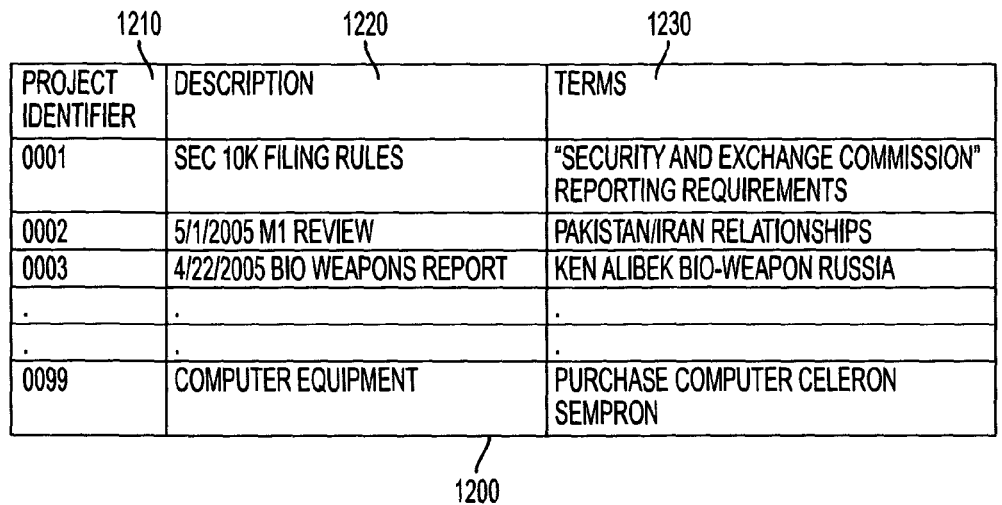
FIG. 13 is an exemplary data structure for storing user profiles according to an aspect of this invention.

FIG. 13 is an exemplary data structure for storing user profiles 1200 according to an aspect of this invention. The exemplary data structure for storing user profiles 1200 is comprised of a project identifier portion 1210; a description portion 1220; and a term portion 1230.

The first row contains the value "0001" in the project identifier portion 1210. This value is used to associate a task or sub-task with task specific keywords extracted from the user history. The user history may be divided into a number of tasks or sub-tasks associated with a specific information retrieval goal. In one exemplary embodiment according to this invention, the user enters a project identifier at the beginning of each search session. The user history is comprised of documents accessed in completing the task. The user history is then labeled or associated with the project identifier. The project identifier is useful in re-finding and/or discovering new information related to the task. In still other exemplary embodiments, the project identified user profile is helpful in sharing knowledge about what information resources a particular user consults to perform the task. This is helpful when the user is un-available due to illness, retirement and the like.

The description portion 1220 contains the value "SEC 10K FILING RULES". This value is helpful in understanding the nature of the task the user was attempting to perform. In this case, the user history was created when the user retrieved information about "Securities & Exchange Commission 10K Filing Rules". The user may be a corporate officer searching for rule changes before preparing a 10-K filing with the U.S. Securities & Exchange Commission. When a new officer is appointed, the user history of her predecessor is available allowing the re-use of organizational knowledge. The value in the description portion 1220 is useful in performing searches across various projects.

The terms portion 1230 contains the value "'SECURITY AND EXCHANGE COMMISSION' REPORTING REQUIREMENTS". This value indicates extracted keywords descriptive of the documents in the user history. In one exemplary embodiment according to this invention, the values in the terms portion 1230 are obtained by analyzing the documents in the project specific user history. Stop-words are removed, stemming is performed and a set of keywords is formed. The 1000 best or N-best keywords are identified and used to form a user profile or project specific user profile descriptive of the user history.

The second row contains the values "0002", "May 1, 2005 M1 REVIEW", "PAKISTAN/IRAN RELATIONSHIPS". This indicates that the second row is associated with project "0002" which is about a May 1, 2005 M1 review session. The documents in the user history pertaining to project 0002 are retrieved and analyzed. The keywords "PAKISTAN/IRAN RELATIONSHIPS" are determined to be descriptive of the documents retrieved from the project 0002 user history.

The third row contains the values "0003", "Apr. 22. 2005 BIO-WEAPONS REPORT", "KEN ALIBEK BIO-WEAPON RUSSIA". These values indicate that project 3 is described as an Apr. 22, 2005 Bio-Weapons Report and that the user profile terms include KEN, ALIBECK, BIO-WEAPON and RUSSIA.

The last row contains the values "0099", "COMPUTER EQUIPMENT", "PURCHASE COMPUTER CELERON SEMPRON". These values indicate that project 4 is described as an information retrieval task related to computer equipment. The user profile terms or keywords indicate the words "purchase", "computer", "Celeron" and "Sempron" are highly descriptive of the documents in the user history associated with project 4.

Figure 14:
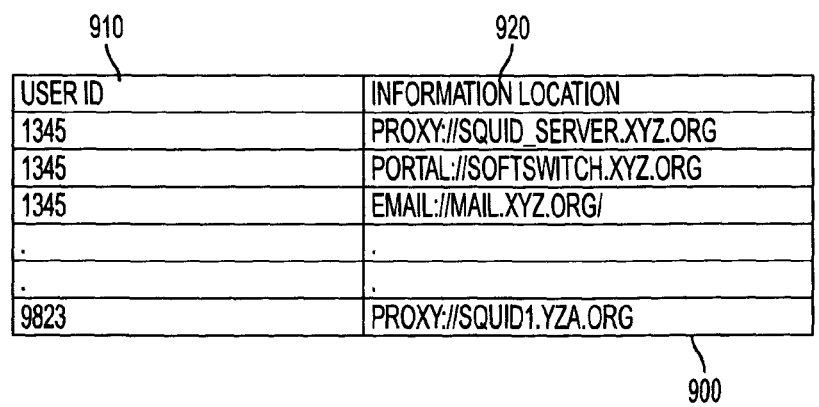
FIG. 14 is an exemplary data structure for storing user history associations according to an aspect of this invention.

FIG. 14 is an exemplary data structure for storing user history associations 900 according to an aspect of this invention. The exemplary data structure for storing user history associations 900 is comprised of: a user identifier portion 910; and an information location portion 920.

The first row entry contains the value "1345" in the user identifier portion 910. The user identifier value uniquely identifies the user within the system for personalized search. The user identifier value is a locally unique value within the system for personalized search, a globally unique user identifier such as an email address or the like.

The "PROXY://SQUID_SERVER.XYZ.ORG" value in the information portion 920 reflects the location of a first source of user history information for the user. In one embodiment, the source of user history information reflects the transactions logs of different information sources consulted by a user. In one embodiment, the value in the information location portion 920 is divided into a media/protocol descriptor portion, a server portion and an optional file location portion. Thus, the value "PROXY:" in the media/protocol descriptor portion indicates that the user history information is a proxy server. The "SQUID_SERVER.XYZ.ORG" value in the server portion of the information location portion 920 is used to indicate the name of the specific server, the subdirectory and/or any userid and password necessary to gain access to the user history information.

The second row contains the values "1345", "PORTAL://SOFTSWITCH.XYZ.ORG". These value reflect a second source of user history information associated with user "1345". In this case, the user history information reflects user telephone call information. The telephone call information reflects the variety of information that can be incorporated into a user history. For example, in one embodiment, the telephone calls reflect sources of audio information useful in completing as task. The audio information is dynamically transcribed using automatic speech recognition and the like.

The third row contains the values "1345", "EMAIL://MAIL.XYZ.ORG". The information contained in the email server "MAIL.XYZ.ORG", serves as a third source of user history information. For example, the uniform resource locator or URL information embedded within an email message reflects information likely to be relevant to an information retrieval task performed by the user. Similarly, URLs in the sent mail are also useful sources of information relevant to the user's work. The user history email is added as an additional source of user history information.

The last row contains the values "9823", "PROXY://SQUID1.YZA.ORG". The history of the user access patterns within the World Wide Web documents is stored within the SQUID1 web proxy server for organization "YZA". The web proxy user history information is retrieved by the system for personalized search and used to create a user profile.

FIG. 15 is an exemplary data structure for storing task profiles 800 according to an aspect of this invention. The exemplary data structure for storing task profiles 800 is comprised of: a user identifier portion 810 and a profile portion 820.

The first row entry contains the value "1345" in the user identifier portion 810. The user identifier value uniquely identifies the user within the system for personalized search. The user identifier value is a locally unique value within the system for personalized search, a globally unique user identifier such as an email address or the like.

The profile portion 820 contains the value FTP://GROUP1.XYZ.ORG/USERS/1345/.USER_PROFILE. This value indicates that the user profile is located on server "GROUP1" within the "XYZ.ORG" domain. The information is contained within the file ".USER_PROFILE" stored within the subdirectory "/USERS/1345" and is accessible via the FTP protocol. It will be apparent that various types of information repositories or storage devices can be used to store the user profile information in the practice of this invention.

The second row contains the values "1345", FTP://GROUP1.XYZ.ORG/USERS/1345/.PROJECT0001. These values reflect a user profile associated with user 1345 and project 0001. The project specific user profile is developed by selecting user history information associated with the specified project. The documents accessed by the user in performing the specified project are retrieved and a project specific user profile determined. For example, project 0001 is described as "SEC 10K FILING RULES" and is represented by project specific user profile keywords "'SECURITY AND EXCHANGE COMMISSION' REPORTING REQUIREMENTS". These keywords are representative of the documents retrieved by the user in performing the "SEC 10K FILING RULES" project.

The third row contains the values "1345", FTP://GROUP1.XYZ.ORG/USERS/1345/.PROJECT0002. These values reflect a project specific user profile associated with user 1345 and project 0002. The project associated with project id 0002 is described as "May 5, 2005 M1 REVIEW". Project 0002 relates to finding information for a May 1, 2005 M1 group meeting. The project specific user profile describes documents used in the associated information retrieval task. The user profile is accessible to other appropriately authorized personnel via an ftp server, a common file share or the like.

The last row contains the values "9823", FTP://GROUP2.ABC.ORG/USERS/9823/.USER_PROFILE. These values reflect a general user profile for user 9823 in group 2 of "ABC.ORG". The user profile is accessible to appropriately authorized personnel within the group and/or may be accessed by appropriately authorized personnel across organizational boundaries. In this way, information sharing is promoted.

FIG. 16 is a table illustrating the use of the accumulated user profile and proximal neighborhood information according to an aspect of this invention. The user profile is useful in personalizing the search for a user. In particular, the user profile information is useful in re-finding and/or re-visiting information already seen by the user. When shared with others, the user profile of a first user is useful in knowledge sharing with other users.

The user may combine their user profile with documents in a proximal neighborhood to discover new information not already seen. The new information is likely to be topically related since it lies within a threshold link distance of information previously accessed by the user. When combined with the user profile information and a user query, documents relevant to the user's information retrieval task are identified.

In a collaborative environment, the user profile and the proximal neighborhood of a first user can be used by a second user to discover new information. In still other embodiments, the user profile of first, second and/or any number of other users, can be combined with their own and/or other user's proximal neighborhoods to provide collaborative personalized searches.

Figure 17:
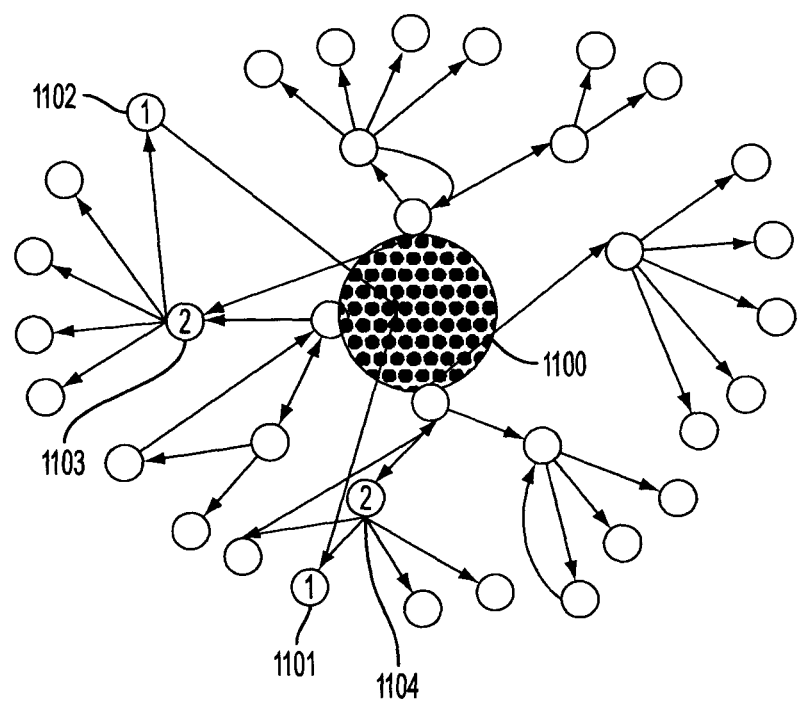
FIG. 17 is a visualization of a portion of a set of linked documents according to an aspect of this invention.

FIG. 17 is a visualization of a portion of a set of linked documents according to an aspect of this invention. The central document 1100 reflects a document previously accessed by a user. Due to topical locality, surrounding pages are likely related to previously accessed user history documents. Documents within a crawling distance or a threshold link distance of the accessed document are included within the proximal neighborhood. The proximal neighborhood is comprised of the set of documents linked to previously accessed documents but which have not yet been seen by the user. First and second documents 1101 and 1102 respectively, are each 1 link away from the accessed document 1100. Third and fourth documents 1103 and 1104 are each 2 links away from the accessed document 1100. The first, second, third and fourth documents would be included within a proximal neighborhood defined by a threshold link value of 2. A query is used to search the documents in the proximal neighborhood. The user profile is then used to order or rank the results.

In the various embodiments of the system for personalized search 100, each of the circuits 10-55 outlined above can be implemented as portions of a suitably programmed general-purpose computer. Alternatively, 10-55 of the system for personalized search 100 outlined above can be implemented as physically distinct hardware circuits within an ASIC, or using a FPGA, a PDL, a PLA or a PAL, or using discrete logic elements or discrete circuit elements. The particular form each of the circuits 10-55 of the system for personalized search 100 outlined above will take is a design choice and will be obvious and predictable to those skilled in the art.

Moreover, the system for personalized search 100 and/or each of the various circuits discussed above can each be implemented as software routines, managers or objects executing on a programmed general purpose computer, a special purpose computer, a microprocessor or the like. In this case, the system for personalized search 100 and/or each of the various circuits discussed above can each be implemented as one or more routines embedded in the communications network, as a resource residing on a server, or the like. The system for personalized search 100 and the various circuits discussed above can also be implemented by physically incorporating the system for personalized search 100 into software and/or hardware system, such as the hardware and software systems of a web server or a client device.

It will be apparent that in various other exemplary embodiments according to this invention, the term linked documents includes, textual, audio, video documents, objects and/or other statically or dynamically linked information items. It should also be apparent that in other exemplary embodiments, the personalized search may be combined with a conventional search in various ways. For example, a personal search for a query may combine a search across the Word-Wide-Web with a search across one or more proximal neighborhoods. Newly discovered results from the proximal neighborhoods may be displayed within, or adjacent to non-proximal search results from the larger non proximal collection of documents.

As shown in FIG. 7, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 2 and 7, can each be any known or later developed device or system for connecting a communication device to the system for personalized search 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for personalized search comprising the steps of:
    receiving a query from a user;
    identifying the user;
    retrieving a user history for the user comprising access patterns identifying linked information elements previously accessed by the user within an information repository;
    identifying a user profile comprising keywords relevant to the access patterns in the user history;
    determining a proximal neighborhood using the user history in the user profile, wherein the proximal neighborhood comprises only linked information elements previously unseen by the user that are within a threshold distance of the linked information elements in the user history; and
    applying the query to the unseen linked information elements in the proximal neighborhood and determining search results comprising the unseen linked information elements that match the query.

2. The method of claim 1, wherein the proximal neighborhood further comprises the linked information elements and is determined by applying a crawling strategy.

3. The method of claim 2, wherein the crawling strategy comprises at least one of a link ranking function, a backlink function, and a breadth first search.

4. The method of claim 2, wherein a threshold link distance is set for the crawling strategy.

5. The method of claim 1, wherein the user history comprises at least one of a web access log, a library manager, a web proxy server log, a browser history file, and a server access log.

6. The method of claim 1, wherein the information repository comprises at least one of a website, a document repository, and a hard drive.

7. The method of claim 6, wherein the document repository comprises at least one of a digital library, a document management system, and a server.

8. The method of claim 1, wherein user histories, user profiles, and proximal neighborhoods are determined for a first user and at least one other user, and in which at least one of the user history, the user profiles and the proximal neighborhoods form a combination.

9. The method of claim 8, wherein the combination comprises at least one of union, intersection, addition, and subtraction.

10. The method of claim 1, wherein a first user history is associated with a first user and a second user history is associated with a second user and the first user history is used by the second user.

11. The method of claim 10, wherein a first user proximal neighborhood is associated with the first user and a second user proximal neighborhood is associated with the second user and the first user proximal neighborhood is used by the second user.

12. The method of claim 10, wherein a first user profile is associated with the first user and a second user profile is associated with the second user and the first user profile is used by the second user.

13. The method of claim 1, wherein the linked information elements comprise at least one of audio, video, and textual information.

14. The method of claim 1, in which the linked information elements comprise linked documents.

15. The method of claim 1, wherein the proximal neighborhood comprises at least one of audio, video, and textual information.

16. The method of claim 1, wherein the search results are ordered based on the keywords relevant to the access patterns in the user history.

17. The method of claim 1, wherein the user history is categorized.

18. The method of claim 17, wherein the categories comprise at least one of tasks, projects, and organizations.

19. A system for personalized search comprising:
    a memory;
    an input/output circuit that receives a user query from a user;
    a processor that identifies the user;
    a user history retrieval circuit that retrieves the user history for the user comprising access patterns identifying linked information elements previously accessed by the user within an information repository;
    a profile identification circuit that identifies a user profile comprising keywords relevant to access patterns in the user history;
    a proximal neighborhood determination circuit that determines a proximal neighborhood using the user history in the user profile, wherein the proximal neighborhood comprises only linked information elements previously unseen by the user that are within a threshold distance of the linked information elements in the user history; and
    a search circuit that applies the query to the unseen linked information elements in the proximal neighborhood and that determines search results comprising the unseen linked information elements that match the query.

20. The system of claim 19, wherein the proximal neighborhood further comprises the linked information elements and is determined by applying a crawling strategy.

21. The system of claim 20, wherein the crawling strategy comprises at least one of a link ranking function, a backlink function, and a breadth first search.

22. The system of claim 20, wherein a threshold link distance is set for the crawling strategy.

23. The system of claim 19, wherein the user history comprises at least one of a web access log, a library manager, a web proxy server log, a browser history file, and a server access log.

24. The system of claim 19, wherein the information repository comprises at least one of a website, a document repository, and a hard drive.

25. The system of claim 24, wherein the document repository comprises at least one of a digital library, a document management system, and a server.

26. The system of claim 19, wherein user histories, user profiles, and proximal neighborhoods are determined for a first user and at least one other user, and in which at least one of the user history, the user profiles and the proximal neighborhoods form a combination.

27. The system of claim 26, wherein the combination comprises at least one of union, intersection, addition, and subtraction.

28. The system of claim 19, wherein a first user history is associated with a first user and a second user history is associated with a second user and the first user history is used by the second user.

29. The system of claim 28, wherein a first user proximal neighborhood is associated with the first user and a second user proximal neighborhood is associated with the second user and the first user proximal neighborhood is used by the second user.

30. The system of claim 28, wherein a first user profile is associated with the first user and a second user profile is associated with the second user and the first user profile is used by the second user.

31. The system of claim 19, wherein the linked information elements comprise at least one of audio, video, and textual information.

32. The system of claim 19, in which the linked information elements comprise linked documents.

33. The system of claim 19, wherein the proximal neighborhood comprises at least one of audio, video, and textual information.

34. The system of claim 19, wherein the search results are ordered based on the user keywords relevant to the access patterns in the user history.

35. The system of claim 19, wherein the user history is categorized.

36. The system of claim 35, wherein the categories comprise at least one of tasks, projects, and organizations.

* * * * *

(12) INTER PARTES REVIEW CERTIFICATE (4112th)

United States Patent
Chi et al.

(10) Number: US 8,606,781 K1
(45) Certificate Issued: Sep. 5, 2025

(54) SYSTEMS AND METHODS FOR PERSONALIZED SEARCH

(75) Inventors: Ed Chi; Fabio Gasparetti

(73) Assignee: XEROX CORPORATION

Trial Number:

IPR2021-01467 filed Aug. 31, 2021

Inter Partes Review Certificate for:

Patent No.: 8,606,781
Issued: Dec. 10, 2013
Appl. No.: 11/200,557
Filed: Aug. 9, 2005

The results of IPR2021-01467 are reflected in this inter partes review certificate under 35 U.S.C. 318(b).

INTER PARTES REVIEW CERTIFICATE
U.S. Patent 8,606,781 K1
Trial No. IPR2021-01467
Certificate Issued Sep. 5, 2025

AS A RESULT OF THE INTER PARTES REVIEW PROCEEDING, IT HAS BEEN DETERMINED THAT:

Claims 1-36 are cancelled.

\* \* \* \* \*